(No Model.)

J. M. CARPENTER.
DIE STOCK.

No. 458,220. Patented Aug. 25, 1891.

Witnesses:
Pennington Halsted
Wm. S. Rogers

Inventor:
James M. Carpenter
by Baldwin Bates
his atty.

UNITED STATES PATENT OFFICE.

JAMES M. CARPENTER, OF PAWTUCKET, RHODE ISLAND.

DIE-STOCK.

SPECIFICATION forming part of Letters Patent No. 458,220, dated August 25, 1891.

Application filed April 21, 1891. Serial No. 389,749. (No model.)

*To all whom it may concern:*

Be it known that I, JAMES M. CARPENTER, of Pawtucket, in the county of Providence and State of Rhode Island, have invented a new and useful Improvement in Die-Stocks, of which the following is a specification.

My invention is an improvement on the invention shown and described in former Letters Patent granted to me August 12, 1890, No. 434,320, for an improved die-stock, and lies in providing a cam-plate with eccentric slots, such that the plate when turned will move the guides to the required position and when at rest will, without being tightened as described in said former Letters Patent, hold the guides in place; and also in an improvement in the construction of the die-stock, consisting in providing between the die and the cam-plate a web or shield to arrest chippings from the screw-bolt, which otherwise might fall upon the cam-plate and clog it.

In the use of the device as shown and described in my said former Letters Patent it is necessary after the plate has been turned and has forced the guides upon the bolt that the plate should tightened in order to keep the guides in place, and for that purpose two screws were provided, passing through slots in the plate, the slots to permit the plate to be rotated and the screws to be screwed down upon the plate, causing it to bind and be tightened, and thus be prevented from turning in order to hold the guides in place while the thread was being cut on the bolt. In my present invention this necessity for tightening the plate is obviated and the means therefor shown in said former Letters Patent are dispensed with. By dispensing with these tightening devices I am enabled to give to the slots L of the cam-plate such a form as will enable the plate not only to move the guides, but also to hold them in any required position.

Figure 1:
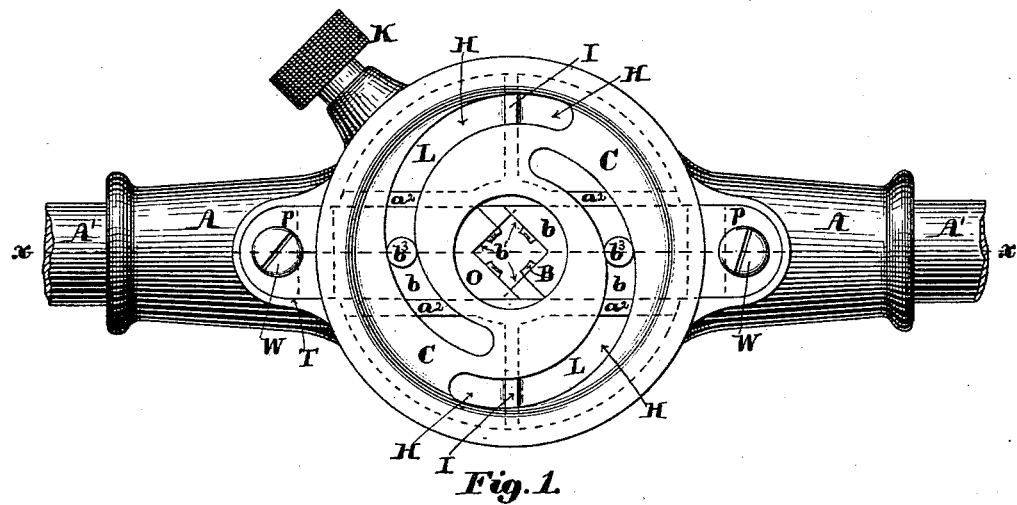
Figure 2:
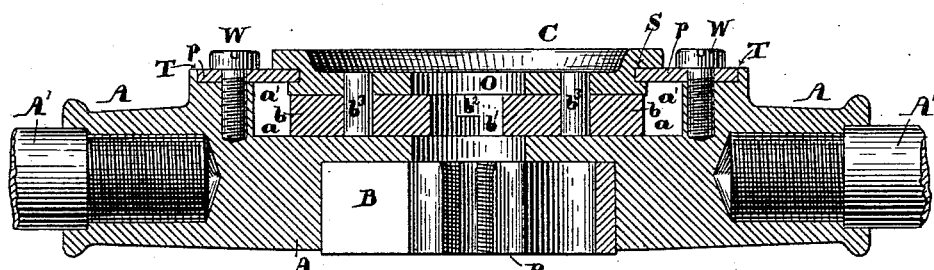
Figure 3:
Figure 5:
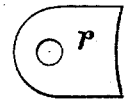
Figure 6:
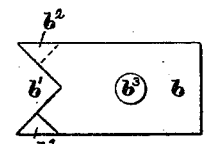
Figure 7:
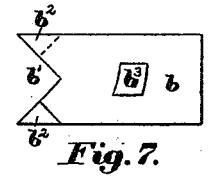
Figure 4:
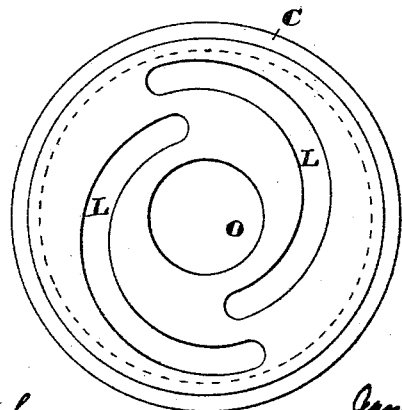

In the drawings, Figure 1 is a plan of the die-stock and die; Fig. 2, a sectional elevation of the same through the line $x\,x$ of Fig. 1. Fig. 3 is an elevation of the cam-plate. Fig. 4 is an inverted plan of the cam-plate. Fig. 5 is a plan of the washers. Fig. 6 is a plan of one of the guides. Fig. 7 is a plan of one of the guides, showing a modification in the shape of the pin.

A is the die-stock, and A' its handles; B, the screw-cutting die, and K a set-screw to hold the die in place.

$a$ are ways provided with flanges $a^2$, in which the adjustable guides $b$ move.

$a'$ are spaces to allow movement of the guides $b$. The guides $b$ fit closely in the ways $a$ between the flanges $a^2$, and are adapted to be moved toward and from each other in said ways. The inner ends of the guides $b$ are notched, as shown, in order, when brought together, to provide the rectangular opening $b'$ to receive the bolt. The guides $b$ are cut away, as shown, on their inner corners to form the interlocking shoulders $b^2$.

I are ribs, between which and the flanges $a^2$ is the web or shield H, which serves to arrest chippings from the screw-bolt, which otherwise might fall upon the cam-plate and clog it.

The cam-plate C is provided with slots L, placed eccentrically to each other, as shown, and through which project the pins $b^3$, with which the guides $b$ are provided, so that when the plate is turned in one direction the guides are forced toward the center of the plate and upon the screw-bolt and when turned in the opposite direction are forced from the center of the plate, and when the plate is at rest the guides are held in place while the thread is being cut on the bolt. Said slots L are longer than the slots for moving the guides shown and described in my said former Letters Patent, and their inclination to the line of movement of the pins approaches nearer a right angle, and by reason thereof the cam-plate of my present invention will hold the guides in position without the tightening devices of my said former Letters Patent.

The cam-plate C is provided with the central opening O for the passage of the bolt to the guides and die, and is secured to the die-stock by means of the washers $p$, which fit the annular recess S in the rim of the cam-plate C, as shown, and prevent the cam-plate from rising from its seat in the die-stock and allow the cam-plate to be rotated. The washers $p$ are first placed in said recess S, and are then put in position in the receptacles T in the die-stock and are there held by the screws W. The screws W, by increasing or decreasing the pressure of the washers upon the cam-plate, also serve to regulate the ease of movement of the cam-plate and guides.

The shape of the pin $b^3$ shown in Fig. 7 gives somewhat greater efficiency in holding the guides in any required position, and obviously must be such as to allow free movement of the pin in the slot of the cam-plate.

I claim—

1. In a die-stock, the adjustable guides herein described, in combination with a cam-plate provided with eccentric slots, which when at rest holds the guides in any required position and when rotated moves the guides to or from the center of the cam-plate, substantially as described.

2. In a die-stock, a web or shield between the die and the cam-plate to arrest chippings from the screw-bolt, substantially as described.

JAMES M. CARPENTER.

Witnesses:
J. EUGENE OSGOOD,
A. FLORENCE ANDERSON.